No. 848,498. PATENTED MAR. 26, 1907.
J. A. SCHERTZ.
TILTING GATE.
APPLICATION FILED DEC. 28, 1906.
2 SHEETS—SHEET 1.
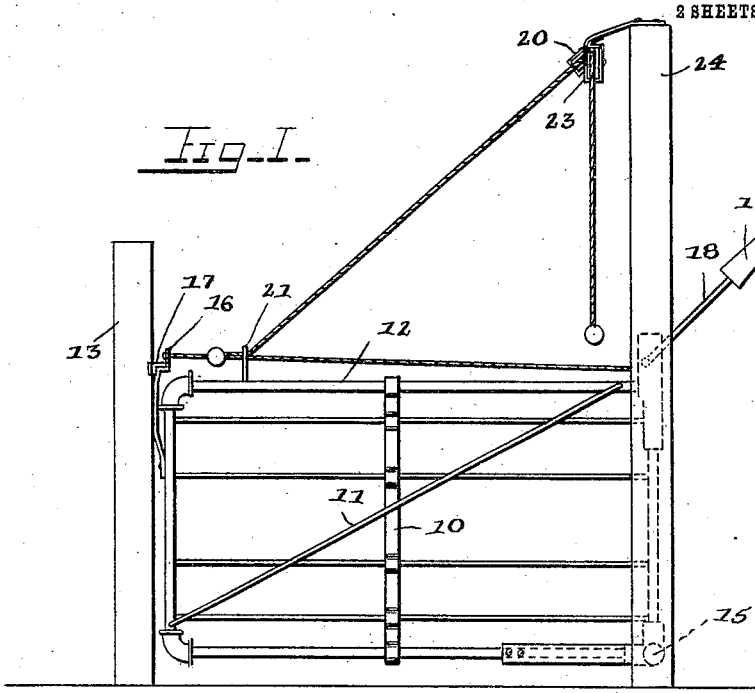
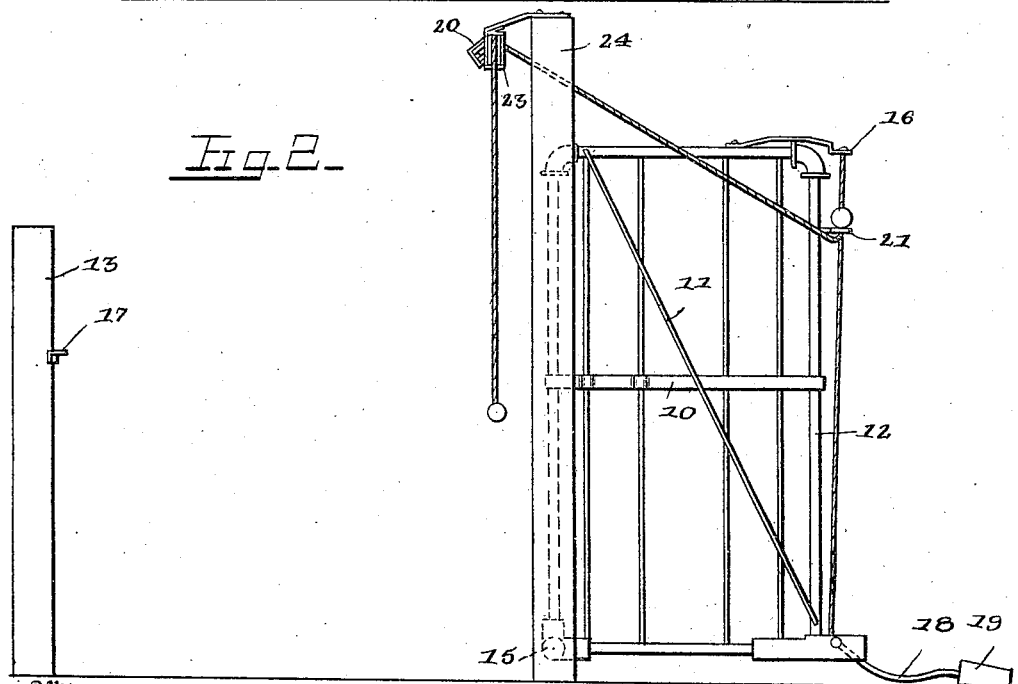

No. 848,498. PATENTED MAR. 26, 1907.
J. A. SCHERTZ.
TILTING GATE.
APPLICATION FILED DEC. 28, 1906.

2 SHEETS—SHEET 2.

Witnesses
Inventor
J. A. Schertz
By
Attorneys

UNITED STATES PATENT OFFICE.

JOSEPH A. SCHERTZ, OF MARQUETTE, NEBRASKA.

TILTING GATE.

No. 848,498.  Specification of Letters Patent.  Patented March 26, 1907.

Application filed December 28, 1906. Serial No. 349,910.

*To all whom it may concern:*

Be it known that I, JOSEPH A. SCHERTZ, a citizen of the United States, residing at Marquette, in the county of Hamilton, State of Nebraska, have invented certain new and useful Improvements in Tilting Gates; and I do hereby declare the following to be a full, clear, and exact description of the invention, such as will enable others skilled in the art to which it appertains to make and use the same.

This invention has relation to that class of gates that are pivoted upon their rear posts, so that the forward end of the gate may be raised and the latter tilted backward out of the way of the driveway through the gate.

It is the purpose of the invention to provide a tilting gate with an adjustable counterweight supported on a resilient arm, so as to properly regulate the point of center of gravity in the operation of the gate to cushion its fall backward and to assist in starting the tilting of the gate forward into closed position.

The nature of the invention is fully ascertainable from the contrivance portrayed in the annexed drawings, forming a part of this specification, in view of which the invention will first be described with respect to its construction and mode of operation and then be pointed out in the subjoined claim.

Figure 3:
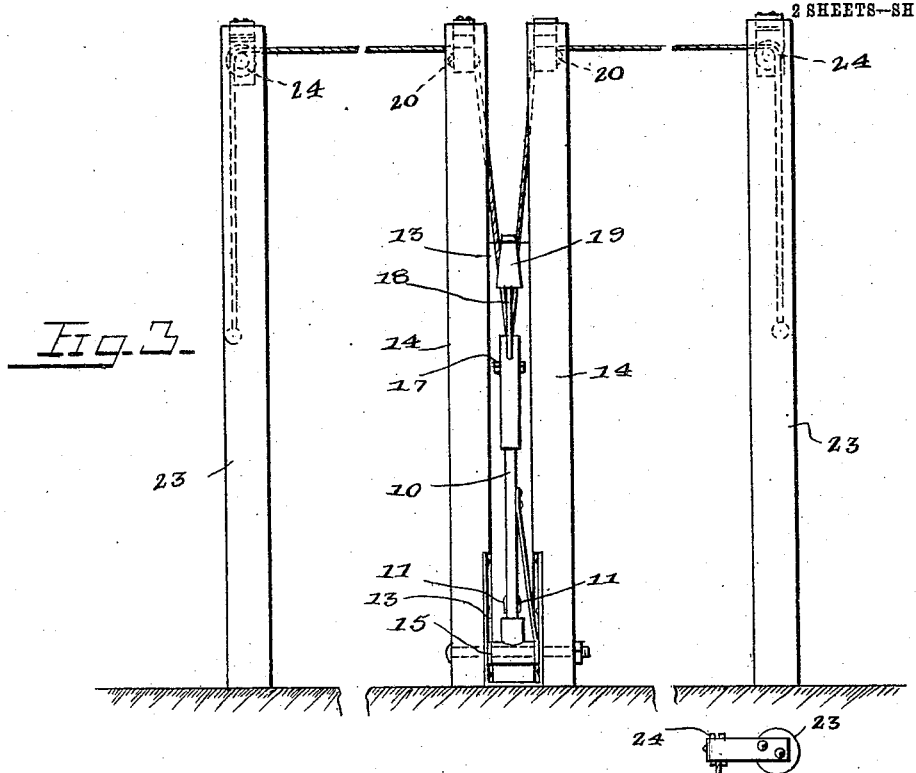
Figure 4:
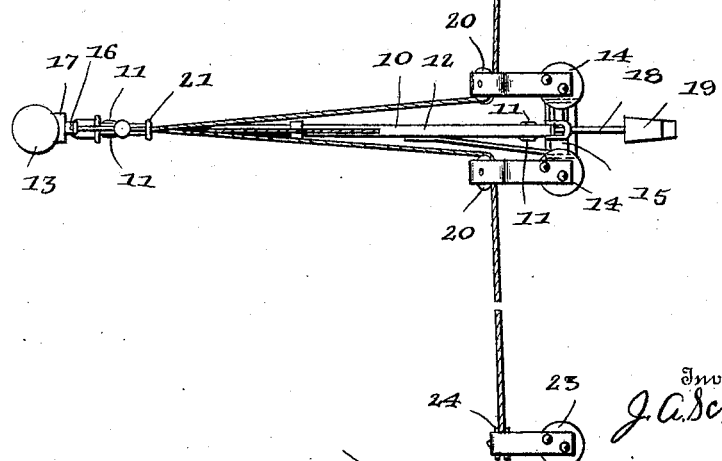

Of the said drawings, Figure 1 is an elevation showing the gate closed. Fig. 2 is an elevation showing the gate opened. Fig. 3 is an end elevation with the gate closed. Fig. 4 is a top plan view.

Similar numerals of reference designate similar parts or features, as the case may be, wherever they occur.

In the drawings, 10 designates the gate proper, which I propose to construct for the most part of gas-pipe in the form of longitudinal bars with truss-rods 11 extending from the lower forward corner to the upper rear corner, the upper bar 12 being formed in some instances from wood. By constructing the gate of hollow iron or steel pipes, as described, I am enabled to make the gate strong and durable and light in weight, so as to be easily operable.

13 designates the front gate-post, and 14 the rear posts between which the lower rear corner 15 of the gate is pivoted. The gate is provided at its upper forward end with a spring-latch 16, that is adapted to engage a catch 17 on the post 13 and hold the front end of the gate against being lifted, and thus opened by mischievous animals on a farm.

From the upper rear corner of the gate there extends rearward and upward a resilient arm 18, that is provided on its outer end with a hollow or box weight 19 to counterbalance the gate on its pivotal support. The box character of the weight affords means for varying the weight by loading or unloading it with sand or other matter in order to regulate its counterbalancing effect. The rod extends from the rear vertical bar of the gate upward at an angle of about forty-five degrees relatively to said gate-bar, and the posts 14 are substantially twice as high as the gate and each has a pulley 20, shackled on an arm extending laterally from its upper end.

21 designates ropes having their forward ends passed through a guide-eye on the top of the gate and connected with the rear end of the spring-latch 16, the other end of each rope being passed about its respective pulley 20 and about a pulley 23 on the top part of a post 24 one on each side of the posts 14 and some distance away from the latter. The free ends of the ropes 21 after passing about the last-mentioned pulleys hang therefrom and are adapted to be taken hold of by a person in a vehicle, on horseback, or on the ground and drawn upon to unlatch the gate and tilt it back to open position, as shown in Fig. 2. The latch 16, it will be seen, is allowed but a limited spring movement rearwardly to effect the unlatching of the gate, when further pull or draft upon the ropes will tend to raise the gate to substantially its center of gravity when the momentum or impetus given to the gate will carry it over its center of gravity, allowing it to fall back, as stated.

When the gate is opened by pulling on one of the ropes 21 on either side of the gate, as stated, and it falls back after passing the center of gravity, the weight 19 on the arm 18 will strike the ground before the gate comes to a stop in fully-opened position. The effect of this will be to bring the weight of the gate to bear on the outer end of the said rod or bar, which being of resilient nature will yield or bend and so cushion the gate in its fall and relieve it of jar or shock.

When it is desired to close the gate, the free end of one of the ropes 21 will be drawn upon again and the gate pulled back with sufficient force to cause the momentum imparted to it to carry it over its center of gravity and allow it to close by gravity.

In starting to close the gate the resilient character of the arm 18 materially assists in the starting of its movement, which is a very important matter. With an impetus once given to the gate to open or close it it becomes relatively easy to increase the momentum, so as to carry the gate over beyond its center of gravity.

What is claimed is—

A tilting gate pivoted at its lower rear corner, and having a resilient weighted arm extending outward and rearward from the rear upper corner, at substantially an angle of forty-five degrees to the plane of the top of the gate, whereby when the gate falls back when fully opened the said weighted arm will yield, cushioning the fall of the gate, and by the tendency of the said resilient arm to resume its straight position, it will assist the effort to start the gate in the movement to close it.

In testimony whereof I affix my signature in presence of two witnesses.

JOSEPH A. SCHERTZ.

Witnesses:
L. T. CUDNEY,
WALTER W. COLBY.